United States Patent Office 2,905,105
Patented Sept. 22, 1959

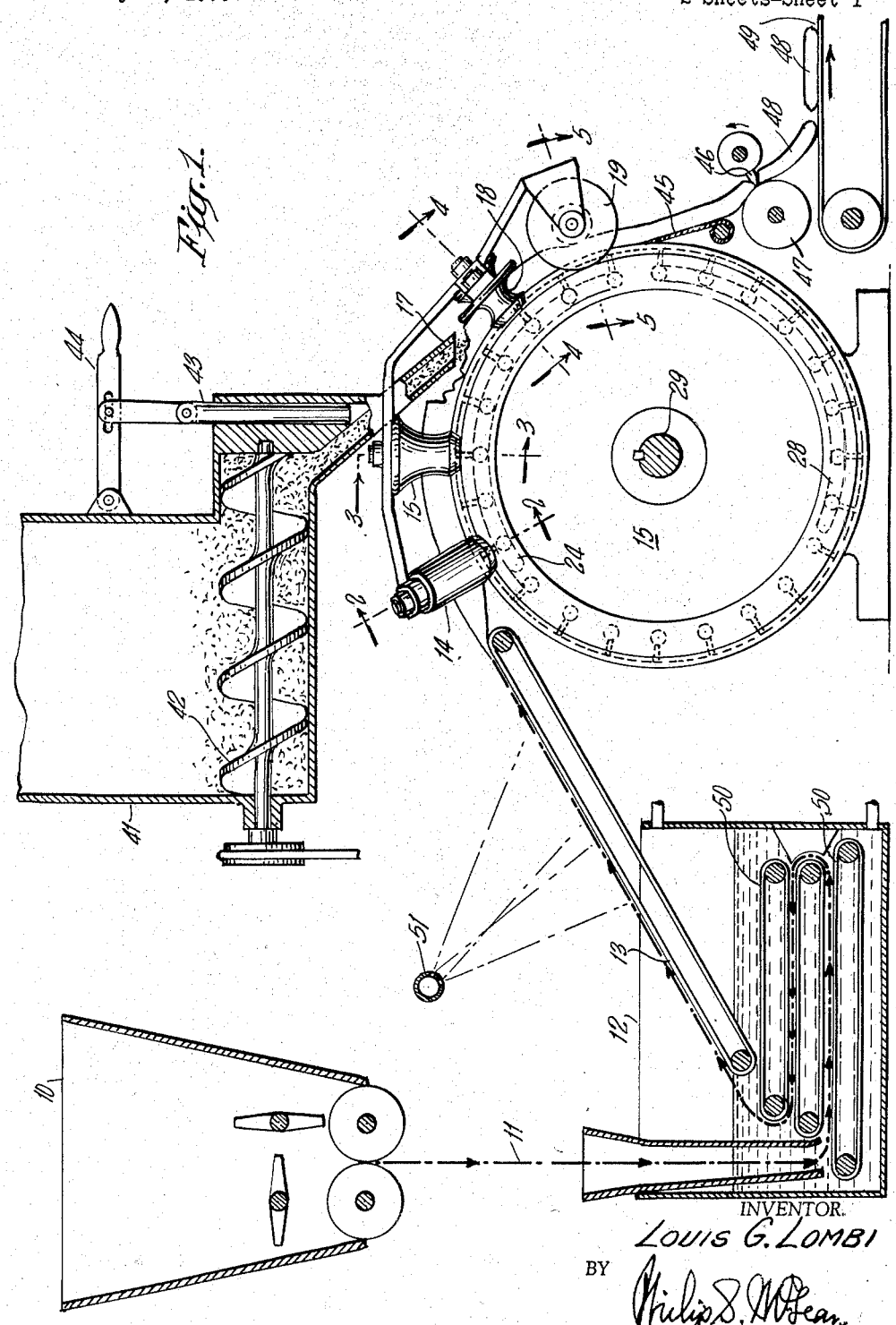

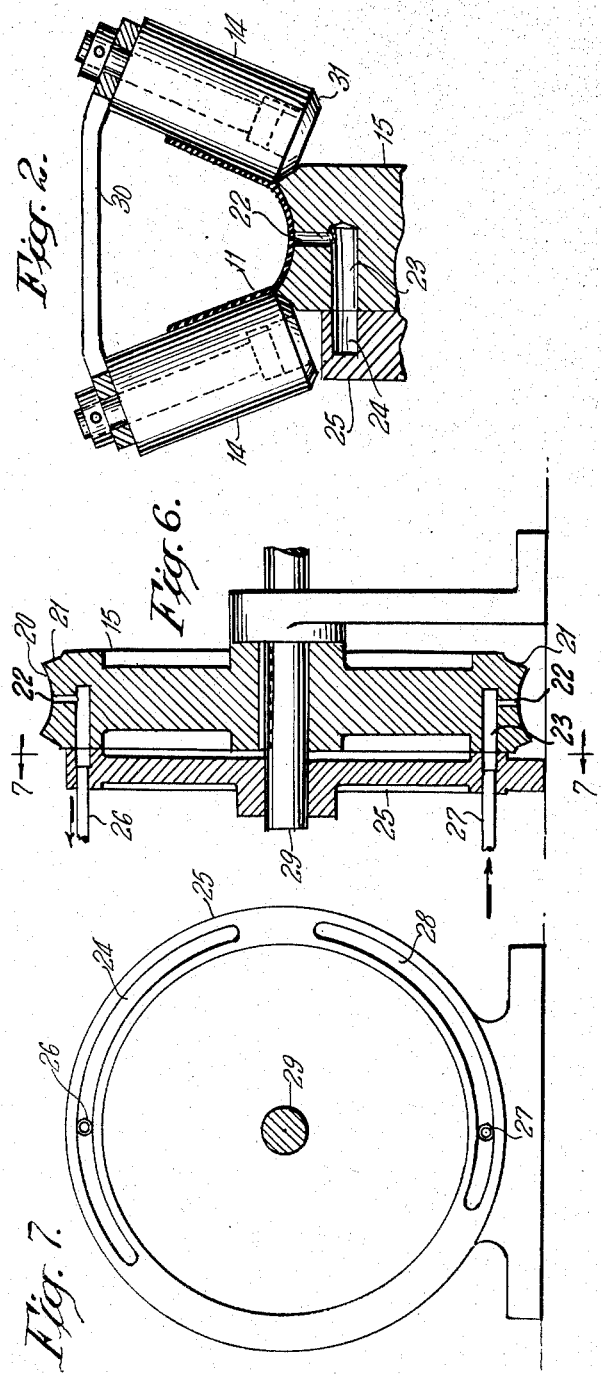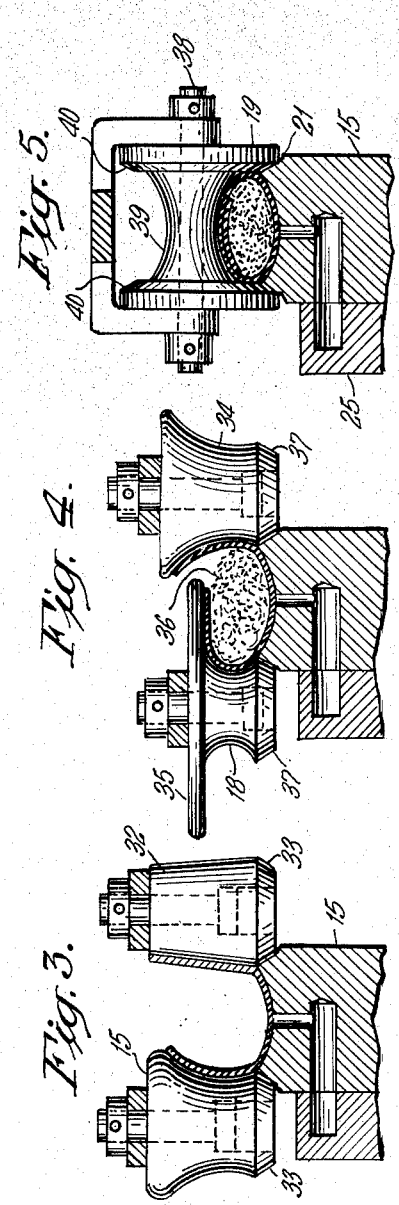

2,905,105

MANICOTTI MACHINE

Louis G. Lombi, Bergenfield, N.J.

Application May 26, 1958, Serial No. 737,942

4 Claims. (Cl. 107—1)

The invention herein disclosed relates to the manufacture of manicotti and products of that nature.

Objects of the invention are to simplify and improve the manufacture of these filled products and in particular to accomplish such manufacture all in one smooth flowing continuous operation.

Further special objects of the invention are to provide a simple, practical automatically operating mechanism which will be self-clearing in its action and of an open character which can be readily cleaned and kept in clean sanitary condition.

The foregoing and other desirable objects are attained by a novel combination and arrangement of parts as hereinafter described and broadly claimed.

The drawings accompanying and forming part of this specification are illustrative of a present preferred embodiment of the invention but it is to be understood that structure may be modified and changed as regards the immediate illustration all within the true intent and scope of the invention as hereinafter defined and claimed.

Fig. 1 in the drawings is a broken sectional and part side elevation view of one of the manicotti machines.

Figs. 2, 3, 4 and 5 are enlarged cross sectional views on substantially the planes of lines 2—2, 3—3, 4—4 and 5—5 of Fig. 1 illustrating operation of the rolls cooperating with the drum to shape a strip of dough first in the form of an open trough to receive the filling and then to fold this strip into closed tubular form over the filling.

Fig. 6 is a vertical cross-sectional view of the drum and associated valve plate for applying suction and pressure to die cavities in the drum at different points in the rotation of the same.

Fig. 7 is a vertical sectional view on substantially the plane of line 7—7, Fig. 6, showing particularly the segmental outlet and inlet ports in the face of the valve plate.

In Fig. 1 the machine is shown as comprising a dough mixer and beater 10 delivering a sheet of dough 11 into a cooking vessel 12, with a conveyer 13 delivering the cooked or partly cooked ribbon or strip of dough to troughing rollers 14 over the upper rim of a forming wheel or drum 15, followed by concave shaping rolls 16, a nozzle 17 depositing the filling material into the open strip, a concave closing roll 18 and an overstanding lapping and sealing roll 19.

The cross-sectional views, Figs. 2, 3, 4, and 5, show the strip shaping and forming wheel 15 as having a concave annular groove 20 in the periphery of the same and opposite sides of the wheel beveled outwardly at 21 to the opposite side edges of the groove.

This groove, as first shown in Fig. 2, forms a concave seat for shaping the intermediate portion of the dough strip to rounded formation and this shaping action is assisted by applying suction to that portion of the groove over which the strip is first laid, by means of suction ports 22 connected by passages 23 open through the face of the wheel to an elongated segmental groove 24 in a valve plate 25 having a suction applying connection 26.

As shown in Figs. 6 and 7 the suction connection 26 enters the segmental valve groove 24 and this groove is sufficient in extent, as indicated in Fig. 1, to apply suction to the series of ports passing in the upper segment of rotation.

Similarly, but to reverse effect, pressure is applied to the ports traversing the lower segment of rotation by means of a pressure applying connection 27, Figs. 6 and 7, opening to a segmental groove 28 in the lower face portion of the valve plate 25.

Fig. 1 shows the suction applying valve groove as extending substantially through the range of travel covered by the shaping and closing rolls, assuring proper holding of the dough strip on the die wheel while the rolls or rollers are performing their shaping and closing operations.

This same view shows the pressure applying valve groove 28 as extending approximately from the position of the last closing roller downward past the lowest point of the wheel so as to apply pressure only after the tubular product has been completed and for a time sufficient to clear the groove and ports in the wheel of flour or possibly fragments of attached material.

The valve plate 25, as shown in Fig. 6, may be sleeved over the shaft 29 carrying the die wheel and possibly held by spring pressure in free sliding engagement with the ported face of the wheel.

The first pair of shaping rolls 14 are shown in Fig. 2 as of generally cylindrical shape journaled opposite each other in downwardly convergent relation on a supporting bracket 30 and having lower beveled ends 31 in free riding engagement with the beveled side edges 21 of the wheel. These rolls turn up the side edges of the dough strip and shape it into the form of an open trough.

The second pair of rolls comprises the concave roll 15 appearing at the front of the machine in Fig. 1 and a companion substantially cylindrical or partly tapered roll 32, Fig. 3, these also having beveled lower ends 33 riding the inclined opposite edges of the wheel.

The third pair of rolls, shown in Fig. 4, comprises the concave roll 18 appearing at the front in Fig. 1 and a companion, less concave roll 34 at the back.

The front, more acutely concave roll 18 has a substantially horizontal flange extension 35 at the top which, as shown in Fig. 4, serves to fold that edge of the strip down over the filling 36 just placed in the strip. The folding roller 34 at the back is less concave and is extended partly above the flange 35 of the first roller so as to fold the second edge of the strip over toward the first folded edge.

Both these rollers have beveled lower ends 37 riding the beveled edges of the wheel.

The last folding and closing step is accomplished in the illustration by a single roller 19 journaled on a horizontal axis 38 and having a concave conformation 39 bridging the rim of the wheel and inclined end flanges 40 substantially matching the beveled edges 21 of the wheel.

This last roller has a curvature to complete the folding of the second edge of the strip down over the inturned first edge and to in effect complete the sealing of the one edge over the other in final tubular formation shown in Fig. 5.

The filling spout or nozzle 17 is shown positioned between the second and third pairs of strip shaping and folding rollers and as connected with a bin or magazine 41 containing the filling material and having a screw conveyer 42 for positively feeding the material. The rate or amount of feed is shown governed by a throttle valve 43 operable by hand lever 44.

The finished product is stripped from the wheel, in the illustration, by an inclined plate 45 and cut into desired lengths by a rotary cutter blade 46 in co-action with a pressure roller 47.

The cut lengths of product 48 are shown in Fig. 1 as dropped on a conveyer belt 49 which may be utilized to transport them to the baking oven.

The sheet of dough is shown in Fig. 1 as carried through the cooker 12 on belts 50 timed to assure cooking to the predetermined extent desired.

On leaving this first cooking stage the dough may be dried to a desired extent as by means of an air blast directed from a pipe 51 over the upwardly inclined conveyer 13 carrying the strip up to the forming wheel.

In operating this machine the thin sheet of dough is preboiled to avoid boiling after filling, which might have the effect of dispersing some of the value or flavoring of the filling. The action from start to finish is a smooth flowing, continuous operation, preserving all the values in both the filling and the dough and the filling is fully sealed in the tubular dough container when it leaves the machine on its way to the oven.

By freely riding the periphery of the wheel, the shaping, forwarding and closing rollers are driven sufficiently to avoid undesirable drag on the dough and, in the construction illustrated, at a higher surface speed, to draw and smooth the dough strip down into place.

What is claimed is:

1. Manicotti machine comprising a wheel rotating on a generally horizontal axis, said wheel having an annular groove in the periphery of the same with suction and pressure ports opening from the body of the wheel into said groove, means for applying a strip of dough over the top of said wheel into said groove, means associated with said wheel for applying suction to said ports in travel of the wheel through the upper segment of rotation to thereby hold said strip on the wheel in travel of the strip over the top of the wheel, means for lifting the edge portions of the strip thus held on the wheel into trough formation, means for introducing filling material into said trough formation portion between said upturned edges of the strip, companion rollers at opposite sides of said wheel for folding one edge of the strip downwardly over the filled material in the trough formation and then the opposite edge of the strip downwardly into overlapped engagement over said first folded edge of the strip to thereby close the strip into complete tubular formation enclosing the filling material, means associated with the wheel for applying fluid pressure to said ports after said closing of the strip into complete tubular formation and during travel of the wheel through the lower segment of rotation to thereby separate the filled tubular formation from the wheel and means for severing the filled tubular formation into separate manicotti sections.

2. The invention according to claim 1 in which said rollers for folding and closing the strip into tubular formation are mounted in freely rotating, driven engagement with opposite sides of the rim of the wheel.

3. Manicotti machine comprising a die wheel having a concave annular groove in the periphery of the same and opposite sides beveled inwardly to said groove and dough strip shaping and folding rollers at opposite sides over the upper portion of said wheel and having beveled lower ends opposed to and in freely riding driven engagement with said beveled sides of said wheel.

4. Manicotti machine comprising a die wheel having an annular groove in the periphery of the same and opposite sides bevelled inwardly to said groove and dough strip shaping and folding rollers at opposite sides over the upper portion of said wheel and having bevelled lower ends opposed to and in freely rotating, driven engagement with said bevelled sides of said wheel and the engagement of said rollers with said wheel being proportioned to effect the driving of said rollers at higher surface speed than said wheel to thereby cause said rollers to exert a wiping and smoothing action on a dough strip on said die wheel.

References Cited in the file of this patent

UNITED STATES PATENTS

| | | |
|---|---|---|
| 1,500,906 | Thompson et al. | July 8, 1924 |
| 1,622,340 | Paeplow | Mar. 29, 1927 |
| 2,152,101 | Scherer | Mar. 28, 1939 |
| 2,227,728 | Lombi | Jan. 7, 1941 |
| 2,323,862 | Zimmerman et al. | July 6, 1943 |
| 2,497,212 | Donofrio | Feb. 14, 1950 |
| 2,574,509 | Stuart | Nov. 13, 1951 |
| 2,714,861 | Castronuovo | Aug. 9, 1955 |
| 2,774,313 | Lombi | Dec. 18, 1956 |